(No Model.)  5 Sheets—Sheet 2.
T. S. BLAIR, Jr.
PROCESS OF REDUCING OXIDES OF IRON.
No. 466,452.  Patented Jan. 5, 1892.
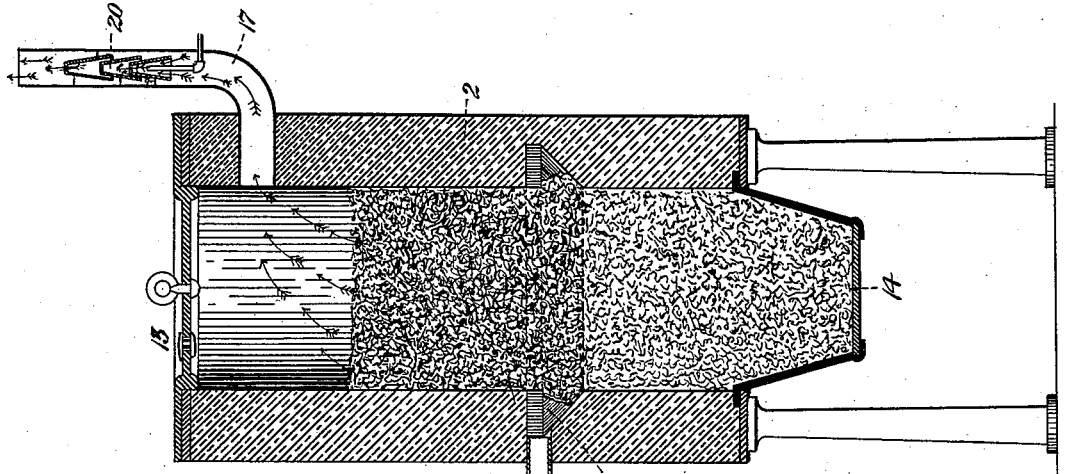
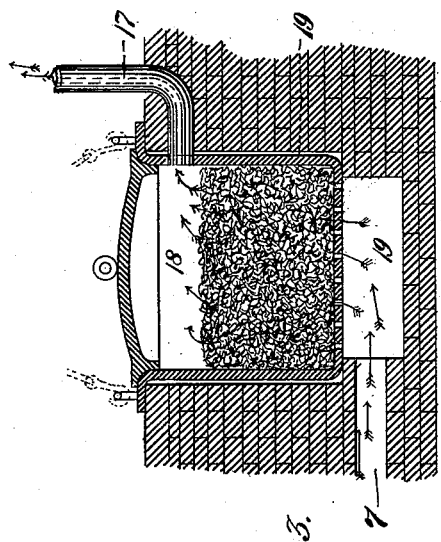
WITNESSES  INVENTOR.

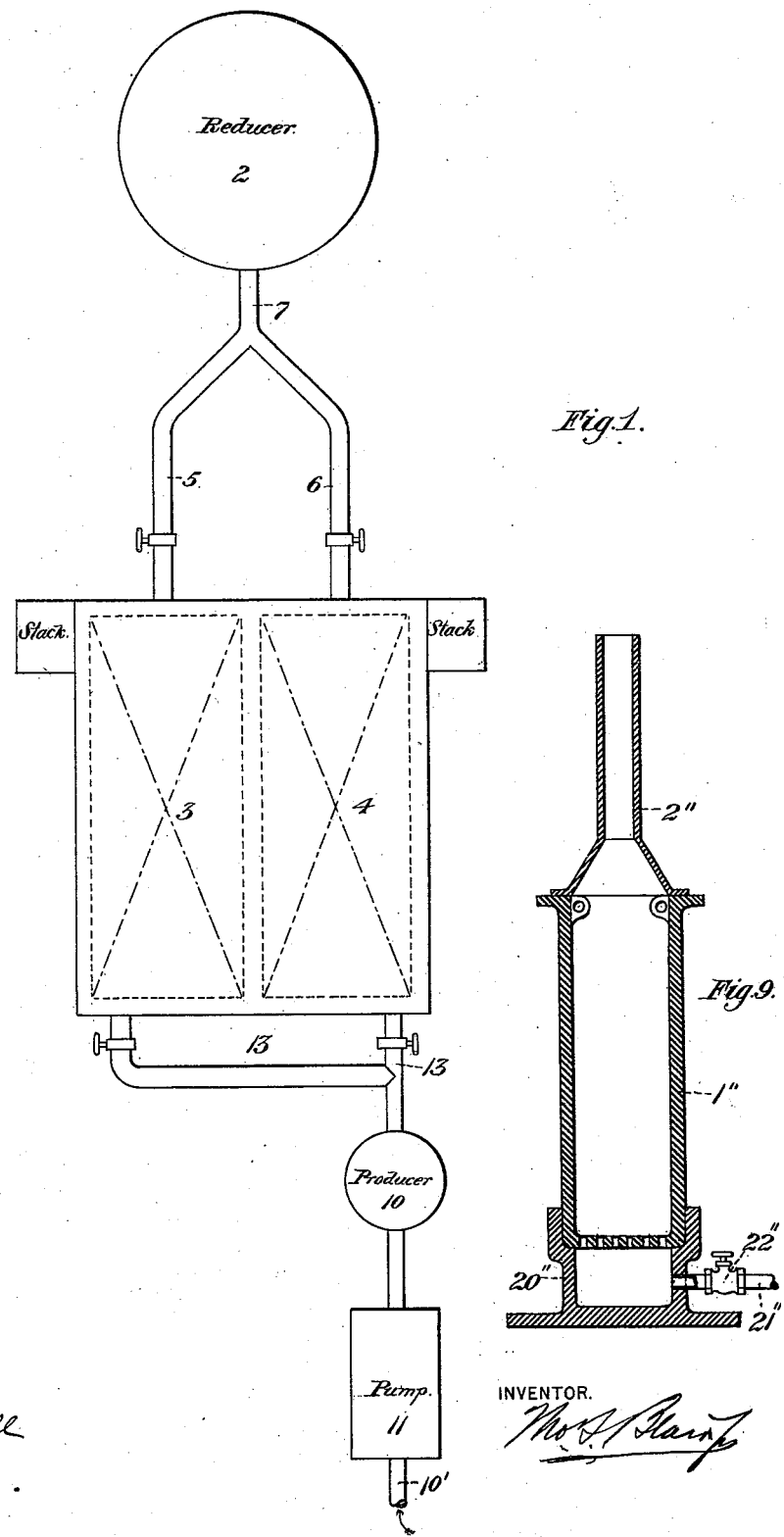

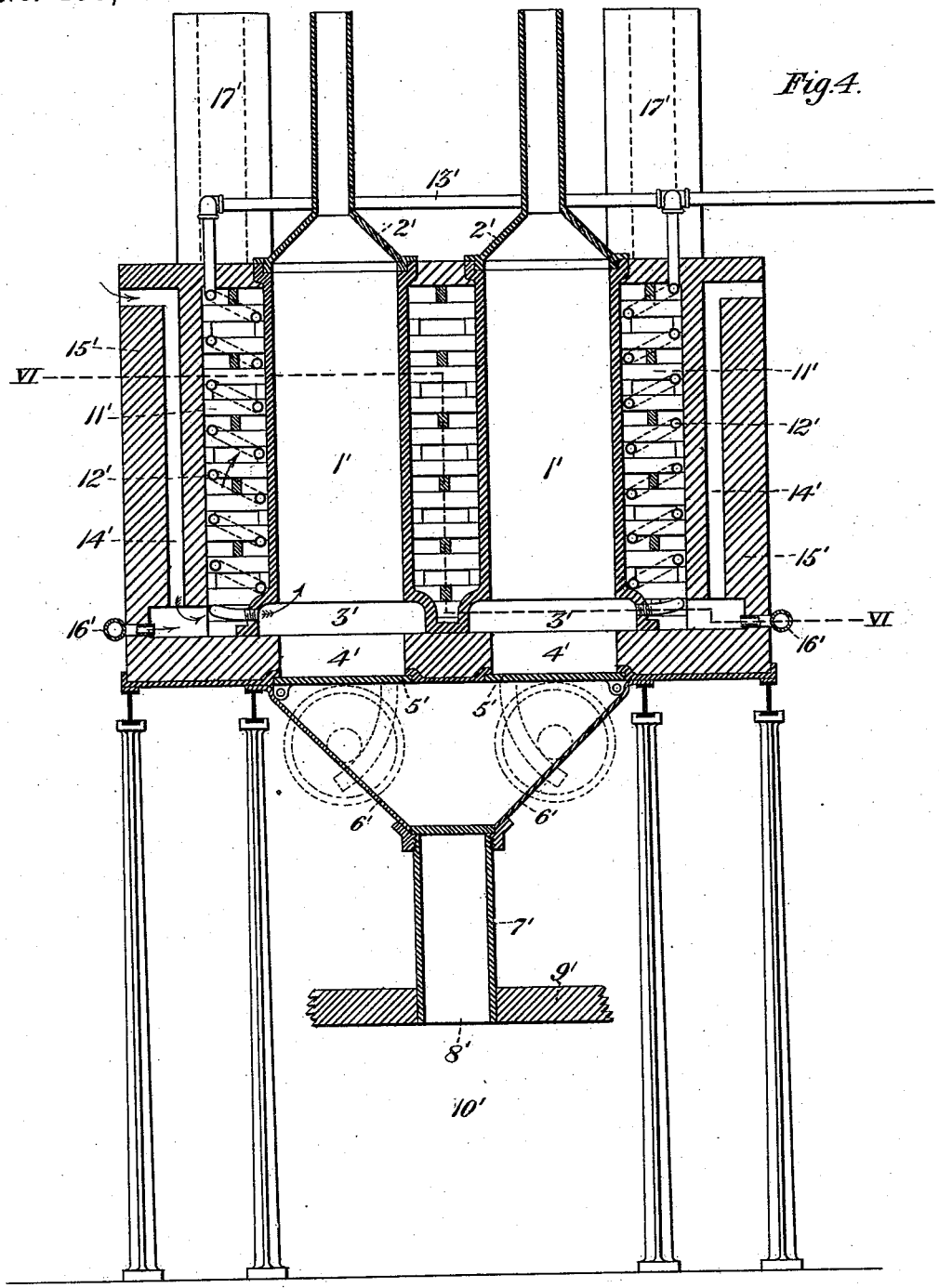

(No Model.) 5 Sheets—Sheet 4.

T. S. BLAIR, Jr.
PROCESS OF REDUCING OXIDES OF IRON.

No. 466,452. Patented Jan. 5, 1892.

WITNESSES
INVENTOR.

(No Model.) 5 Sheets—Sheet 5.

T. S. BLAIR, Jr.
PROCESS OF REDUCING OXIDES OF IRON.

No. 466,452. Patented Jan. 5, 1892.

WITNESSES
Thomas W. Bakewell
Thos. S. Blair.

INVENTOR.
Thos. S. Blair Jr.

UNITED STATES PATENT OFFICE.

THOMAS S. BLAIR, JR., OF ALLEGHENY, ASSIGNOR TO THE STEEL AND IRON IMPROVEMENT COMPANY, OF PITTSBURG, PENNSYLVANIA.

PROCESS OF REDUCING OXIDES OF IRON.

SPECIFICATION forming part of Letters Patent No. 466,452, dated January 5, 1892.

Application filed September 22, 1890. Serial No. 365,733. (No model.) Patented in England October 7, 1890, No. 15,830; in Belgium August 7, 1891, No. 95,945; in Luxemburg August 17, 1891, No. 1,491, and in Spain September 23, 1891, No. 12,441.

*To all whom it may concern:*

Be it known that I, THOMAS S. BLAIR, Jr., of Allegheny, in the county of Allegheny and State of Pennsylvania, have invented a new and useful Improvement in Reducing Metallic Ores, (for which I have received Letters Patent in Spain, twenty-year patent, No. 12,441, dated September 23, 1891; in Belgium, No. 95,945, dated August 7, 1891; in Luxemburg, No. 1,491, dated August 17, 1891; in Great Britain, No. 15,830, dated October 7, 1890,) of which the following is a full, clear, and exact description, reference being had to the accompanying drawings, forming part of this specification, in which—

Figures 5, 6:
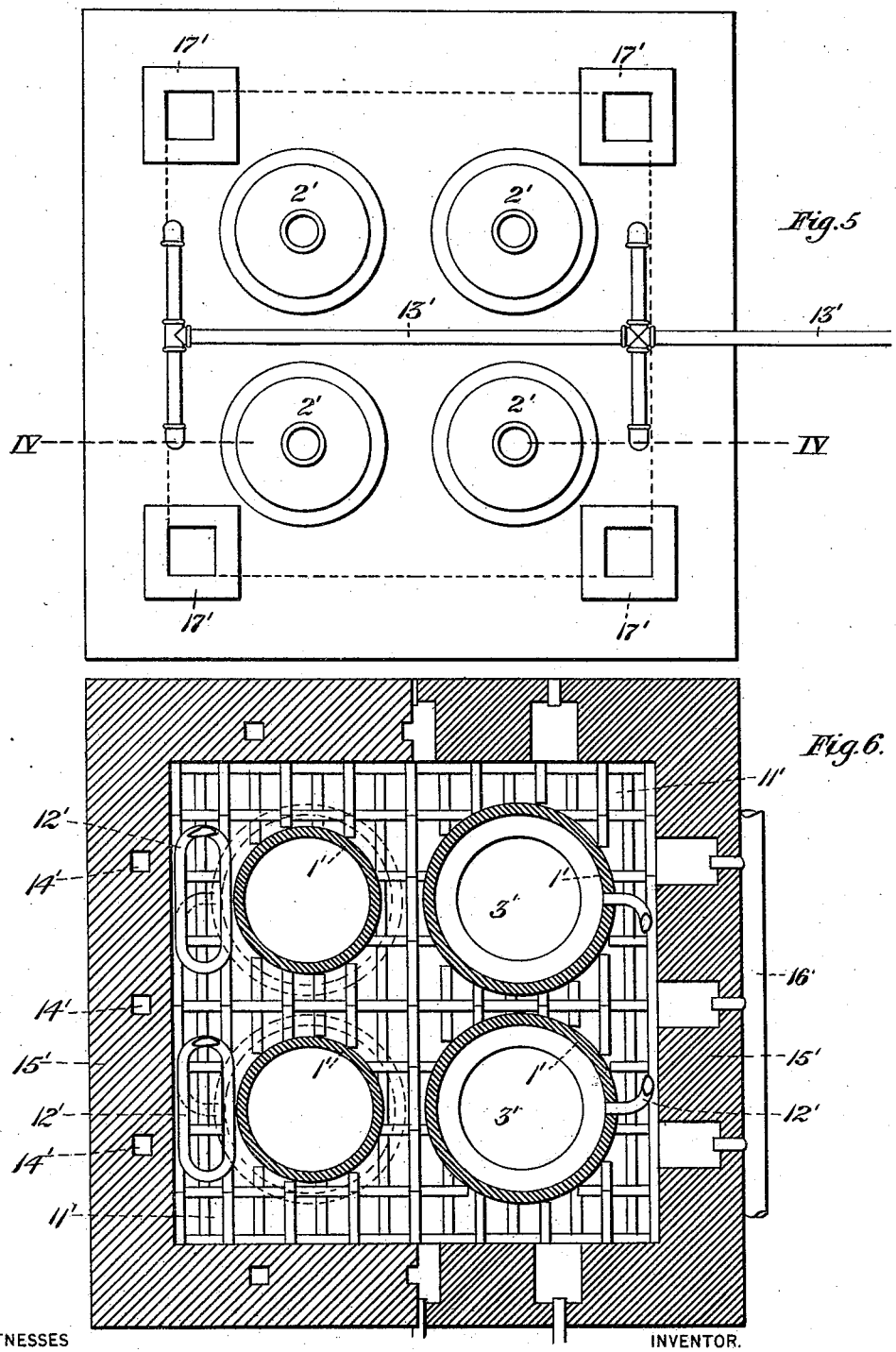
Figure 7:
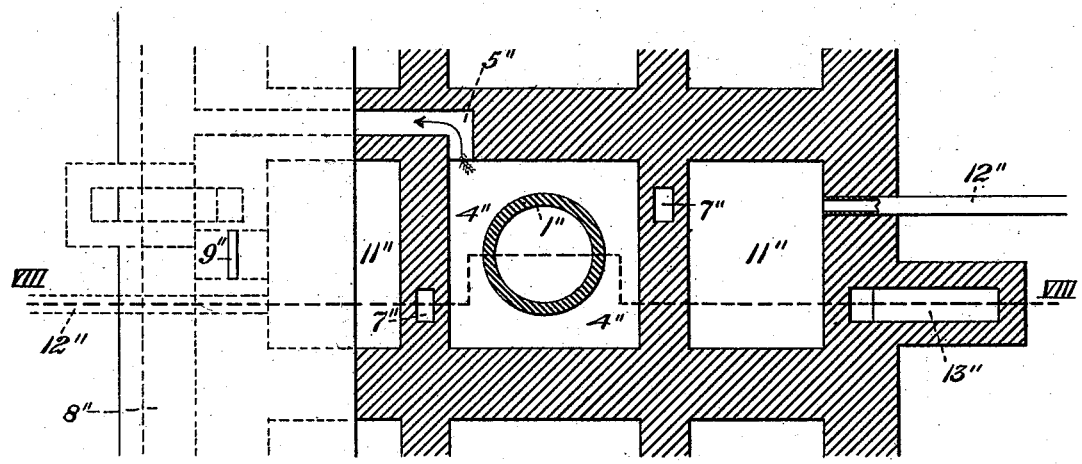

Figure 1 presents a plan view; Fig. 2, a vertical sectional view with the pump in side elevation; Fig. 3, a vertical section of a reducing-chamber of modified form. Fig. 4 is a vertical sectional drawing of reducing apparatus of modified construction set over an open-hearth melting-furnace, the section being taken on the line IV IV of Fig. 5. Fig. 5 presents a plan view. Fig. 6 is a horizontal section through the lines VI VI of Fig. 4. Fig. 7 represents a horizontal section through the line VII VII of Fig. 8, which latter represents a vertical section through the line VIII VIII of Fig. 7 and shows apparatus of modified construction adapted to be used in the practice of my invention; and Fig. 9 is a vertical section showing apparatus for cooling the reduced ore.

Like symbols of reference indicate like parts in each.

This invention relates to that species of processes for the reduction of oxides of iron which consists in sending a current of hot reducing-gas vertically through a columnar body thereof. All of these processes which have ever approximated any successful results whatever—to wit, Chenot's, Gurlt's, and Tourangin's—belong to a single type, of which Gurlt's may be taken as the most characteristic example. The gas is introduced at the base of the column of ore and drawn off or left free to escape at the top. All of them after a more or less limited practical trial have been abandoned.

The object of the present specification is to describe my invention, whereby the reduction of oxides of iron by means of a current of hot reducing-gases passed vertically through a columnar mass thereof can be readily and regularly accomplished.

I have discovered that for success in the prosecution of this operation three several and distinct conditions must be provided, as follows, to wit: There must be, first, a temperature in the gaseous current which shall impart to the ore which it permeates a red heat, which may range between a black red and a yellow, but preferably should be a fairly-bright red; second, such a ratio between the impelling force applied to the gases at the base of the column or the exhausting force at the top thereof, or both combined, and the resistance of the mass of material that a thorough permeation of the mass shall be secured, and, third, such due proportion between the speed of the chemical action of the reducing-gas and the time allowed for the exposure of the oxides to that action as shall insure the adequate performance of the desired chemical reaction. Thus where the element of time is of no special importance the reducing-gas may consist of carbonic-oxide gas alone, such as can be generated from coke or charcoal. It can be depended upon to perform the operation, but with extreme slowness. When it is desirable, and it is often necessary as regards commercial success, that the reduction should take place within a less extended time, the result can be reached by adding to the dry carbonaceous fuel charged into the gas-producer or by using as the sole source of gas production bituminous coal, petroleum, or the like sources of hydrocarbon vapors and gases or by using water-gas; or cyanogen may be developed in the gas-producer by adding to the regular fuel alkaline bodies, which will cause the combination of nitrogen with the carbon of the producer fuel, or cyanides already formed may be charged with the other material into the producer. I particularize these special methods of intensifying and accelerating the deoxidizing action of the gaseous current, because they are simple and cheap and readily put in practice, but do not intend to limit my process to them exclusively.

With the imperfect data now available with reference to the actual attempts made to carry out in practice the inventions described in the several patents of the parties above mentioned it is not possible to define with certainty the particular or particulars in which each of them failed to provide that concourse of conditions essential to success which I have just described. There may, for example, have been proper temperature and sufficient contact, (permeation,) yet if there were not proper adjustment of the duration of exposure to the kind of gas used there would be failure to secure sufficient deoxidation. Again, there may have been lacking only the single element of adequate temperature, or, again, only that of adequate contact because of imperfect permeation; but whatever may be the value of these conjectures it is plain that in no case did the operator provide at one time and in combined action all three of the above-described conditions of success, since I find that whenever they are thus provided the reduction is accomplished regularly and uniformly and within the limits of commercial success.

A great variety of devices may be employed for carrying out in practice the provision in concurrent action of the three above-described requisites—thermal, mechanical, and chemical. I shall, however, confine myself in the present specification to three forms of apparatus, illustrating severally the manner of its application to three different contingencies—namely, first, the case of a columnar mass of ore in which there is considerable resistance to the passage of the permeating current; second, the case of combining in one apparatus and process the deoxidation of the ore and the melting of the resultant spongy iron in the bath of an open-hearth furnace, and, third, the case of making the deoxidation of the ore a separate and distinct operation, the product of which (the spongy iron) can afterward be employed, either hot or cold, as the material for any subsequent process for which it may be adapted.

First. For the treatment of ores which offer a considerable degree of resistance to the passage of the gases through a columnar mass thereof I employ an apparatus capable of propelling the heated gas with a force adequate to overcome such resistance, planned and arranged as set forth in Figs. 1, 2, and 3 of the drawings. In Fig. 1 and 2 is the reducer chamber or kiln. 3 4 are regenerative chambers connected by pipes 5 6 with the inlet-pipe 7 of the reducer. 13 is a gas-supply pipe leading from a producer or source of gas-supply and connected by valve-controlled branches with the regenerators. 10 is a gas-producer adapted to produce a reducing-gas. 10′ is an air-supply pipe, and 11 is a pneumatic pump by which air may be forced into and through the producer, and may be thus converted into reducing-gas. In using the apparatus I heat one of the regenerators by introducing into and burning in it with air a small supply of gas from the producer, and having charged the kiln 2 with ore I open the proper gas-valve to connect the heated regenerator with the gas-supply pipe and cut off the supply of air from the regenerator. The gas is forced through this regenerator at pressure by the pump 11, and being heated therein enters the kiln at the proper temperature. When the temperature of the regenerator through which the gas is flowing falls below a fair red heat, the gas-current is reversed to cause the reducing-gas to pass at pressure through the other (now heated) regenerator in the manner common in gas-heating apparatus of this class. As shown in Fig. 2, the kiln 2 is an upright hollow shaft or kiln having a charging-opening 13 at the top and a discharging-opening 14 at the bottom. The gas-supply pipe enters at 16 and the outlet-pipe 17 leads from the upper part of the kiln. In this outlet-pipe I may place a series of exhausting-nozzles 20, through which steam is blown for the purpose of creating draft by vacuum in the pipe and inducing the gas flow. In Fig. 3 I show a modified form of apparatus in which the ore to be treated is contained in a vessel 18 which is set removably in a chamber 19, and is provided with a perforated bottom. The gas enters the chamber 19 below the bottom of the vessel 18, passes up through the ore in the vessel, and thence escapes through the outlet-pipe. In using both these forms of apparatus the gas is caused to traverse the ore by applying to it pressure and suction, or pressure alone, of the proper degree proportioned to the resistance of the mass, which will be greater or less, accordingly as the ore is packed with greater or less density and according to the depth of the mass overlying the inlet-port.

Second. For the purpose of combining in one apparatus and process the deoxidation of the ore and the melting of the resultant spongy iron in the bath of an open-hearth furnace, I employ an apparatus as shown in Figs. 4, 5, and 6. In Fig. 4, 1′ 1′ are two of the group of four vertical cylindrical chambers into which the ore is charged, the removable funnels or gas-discharge stacks 2′ 2′ being set aside during the operation. 3′ 3′ are continuations of the cylindrical chambers 1′ 1′, made of increased diameter, so that the ore in occupying both shall leave an annular space to operate as the means of introducing the gas into the columnar body of ore. 4′ 4′ are further continuations downward of the vertical chambers for the reception of combustible matter, such as coke, &c., which shall intercept any free oxygen entering at the joints of the drop-bottoms 5′ 5′. 6′ and 7′ are the funnel and conductor which deliver the deoxidized iron sponge through the opening 8′ in the roof 9′ of the open-hearth furnace 10′ directly upon the hearth thereof. (Not shown.) 11′ is the chamber, filled with checker-work of brick, enveloping the pipes 12′, which convey the reducing-gas from its supply-pipe 13' into the reducing-chambers. 14' 14' are passages in the walls 15' of the chamber 11', through which air is admitted and heated before emerging into 11' to ignite and burn fuel-gas, which is introduced thereinto through pipes 16', and which by its combustion heats the reducing-gas in its passage through the pipes 12 and raises it to the temperature required for deoxidation of the ore. 17' 17' are stacks for carrying off the products of the combustion in 11' and for supplying the requisite draft therefor. The method of operation will be readily understood from the specification at large and from the special references above to the functions of the several parts.

Figure 8:
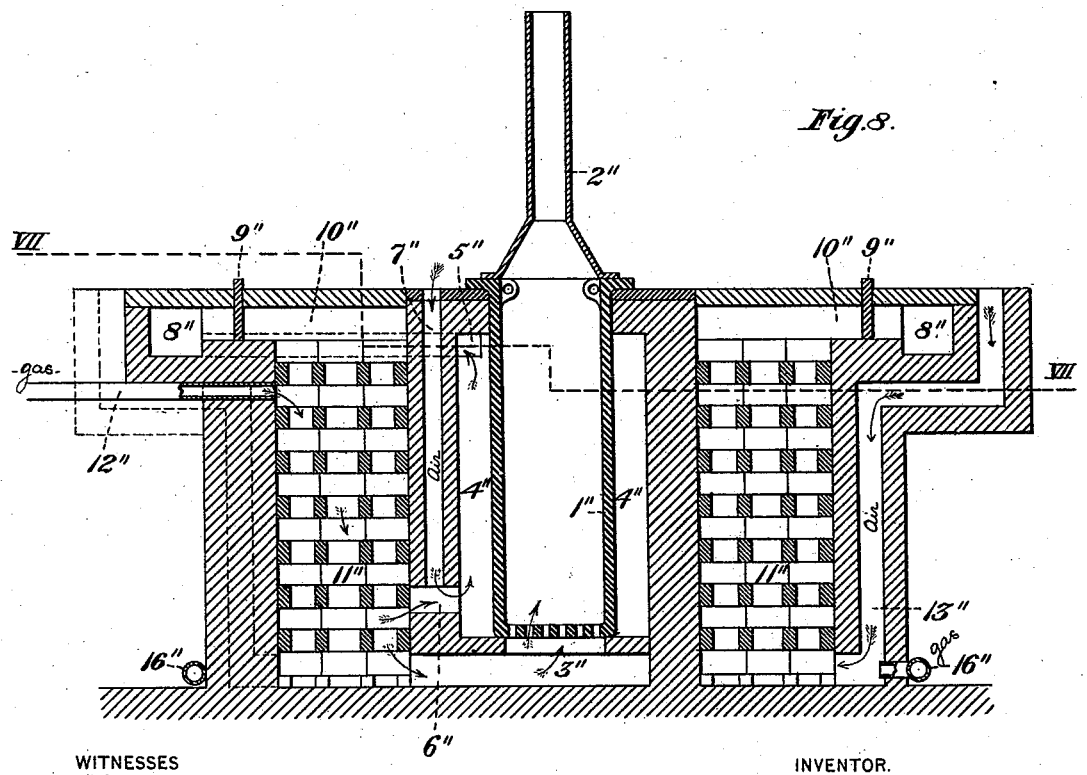

Third. When it is desired to obtain the iron sponge by a separate and distinct operation, so as to be able to command it for a variety of purposes, an apparatus may be employed, such as is shown in Figs. 7, 8, and 9 of the accompanying drawings. 1'' is a cast-iron cylinder, which constitutes the reducing-chamber into which the ore is charged, the funnel 2'' for the escape of the gas being removed when it is to be charged. The bottom of 1'' is perforated, as shown, to admit the reducing-gas delivered beneath it at 3'' after entering through the pipe 12'' and being heated by the checker-work 11'', which latter has previously been heated by the combustion among it of gas introduced through the pipe 16'' and ignited and burned by the air admitted and heated by the conduit 13'', the products of the combustion being carried away by the flue 8''. This alternate heating up of the checker-work and subsequent absorption of this heat by the ingoing reducing-gas for 1'' is accomplished by having a chamber for the purpose on each side, so that the regenerative action is kept constantly in operation by the customary manipulation of the gaseous currents. Exterior heat around 1'' is provided by causing a part of the gas entering through 12'' to be deflected into the chamber 4'' through the passage 6'' before passing into 3''. As it enters 4'' it is met by a current of air conducted to the spot by and heated in its passage through the conduit 7'', the products of this combustion passing off through the flue 5''. After the reduction of the ore has been effected the funnel 2'' is removed and the cylinder 1'' is lifted by the lugs out of 4'' and placed upon the seat on a box 20'', Fig. 9, the funnel 2'' replaced, and the joint at the base of the cylinder luted to prevent the leakage of the non-oxidizing gas which is admitted cold into the box through a pipe 21'' at a pressure regulated by the stopcock 22'', so as to overcome the resistance of the contents of 1'' and establish through the same a current, which is carried off by the funnel. The temperature of the exterior of 1'' and of the gas emerging from the top of the mass of sponge will indicate when the cooling operation is completed and the sponge in consequence fitted for exposure to the air without danger of reoxidation.

It should be understood, as I have already stated, that I do not claim the apparatus herein described, nor do I desire to limit the scope of my invention to its practice in connection with the said apparatus, since apparatus of various other forms may be used, and I have described those shown in the drawings merely for the purpose of illustrating some of the many means for putting my invention to practical use.

It is further to be understood that, although I have made reference to upward movements only, the vertical movement of the gas-current may, if for any reason thought desirable, be a downward one; also, that when describing the mass of ore as "columnar" the qualification is to be understood as not excluding the use of any other form of the mass that may, owing to special circumstances, be more convenient.

I claim—

1. In the art of reducing metallic oxides by a current of deoxidizing gases passed vertically through a mass of such oxides, the improvement which consists, first, in introducing into such mass a current of reducing-gas heated to the temperature of the ore when at a red heat; second, in causing the gas to pass through the mass by pressure or suction regulated in degree in conformity to the resistance afforded by the mass of oxides, and, third, in continuing the exposure of the oxide to the heated reducing-gas until the combined oxygen is eliminated, substantially as described.

2. In the art of reducing metallic ores, the method herein described of cooling the iron sponge after deoxidation by passing a current of cold non-oxidizing gas through the heated deoxidized mass and reducing it thereby to a temperature sufficiently low to prevent reabsorption of oxygen when subsequently exposed to the atmosphere, substantially as described.

In testimony whereof I have hereunto set my hand this 19th day of September, A. D. 1890.

THOS. S. BLAIR, JR.

Witnesses:
THOMAS W. BAKEWELL,
W. P. POTTER.